United States Patent
Lee et al.

(10) Patent No.: US 12,129,366 B2
(45) Date of Patent: Oct. 29, 2024

(54) RECYCLED POLYMER COMPOSITION FOR MANUFACTURING SMALL TO MEDIUM-SIZED CONTAINER INCLUDING HDPE RECOVERED FROM SECONDARY BATTERY SEPARATOR AND SMALL TO MEDIUM-SIZED CONTAINER MANUFACTURED THEREFROM

(71) Applicants: SK Innovation Co., Ltd., Seoul (KR); SK Geo Centric Co., Ltd., Seoul (KR)

(72) Inventors: Hye Jin Lee, Daejeon (KR); Jong Sang Park, Daejeon (KR); Dae Sig Hong, Daejeon (KR); Sang Mook Kang, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/326,082

(22) Filed: May 31, 2023

(65) Prior Publication Data
US 2024/0059878 A1  Feb. 22, 2024

(30) Foreign Application Priority Data

Aug. 19, 2022 (KR) .................. 10-2022-0104064

(51) Int. Cl.
 *C08L 23/06* (2006.01)
 *H01M 50/417* (2021.01)
(52) U.S. Cl.
 CPC .......... *C08L 23/06* (2013.01); *C08L 2207/062* (2013.01); *C08L 2207/20* (2013.01); *H01M 50/417* (2021.01)
(58) Field of Classification Search
 CPC ...... C08L 23/04; C08L 23/08; C08L 23/0807; C08L 23/0815; C08L 2207/20; C08L 2207/62; C08L 2205/025
 See application file for complete search history.

(56) References Cited

U.S. PATENT DOCUMENTS

2005/0004316 A1* 1/2005 Starita ................ C08L 23/16
 525/240
2008/0114131 A1* 5/2008 Harris ................ C08L 23/0815
 525/240

FOREIGN PATENT DOCUMENTS

| | | |
|---|---|---|
| CN | 105742743 A | 7/2016 |
| EP | 561187 A1 | 9/1993 |
| JP | 2021095442 A | 6/2021 |
| KR | 101361314 B1 | 2/2014 |
| KR | 20200001419 A | 1/2020 |
| KR | 102181876 B1 | 11/2020 |
| WO | 2021/233818 A1 | 11/2021 |
| WO | 2022/103116 A1 | 5/2022 |

OTHER PUBLICATIONS

HDPE F120A data sheet (Year: 2023).*
European Patent Office, Appl. 23191024.1, Extended European Search Report, Dec. 20, 2023.

* cited by examiner

*Primary Examiner* — John M Cooney
*Assistant Examiner* — Jeffrey S Lenihan
(74) *Attorney, Agent, or Firm* — Jones Day (57) ABSTRACT

A polymer composition for manufacturing a small to medium-sized container and which includes a high-density polyethylene (HDPE) recovered from a secondary battery separator. A polymer composition having excellent processability may be prepared by recycling a secondary battery separator. The polymer composition may be molded to manufacture an environmentally friendly small to medium-sized container, such as a small to medium-sized container, having excellent flexural strength, elongation, impact strength, and environmental stress crack resistance.

18 Claims, 1 Drawing Sheet

RECYCLED POLYMER COMPOSITION FOR MANUFACTURING SMALL TO MEDIUM-SIZED CONTAINER INCLUDING HDPE RECOVERED FROM SECONDARY BATTERY SEPARATOR AND SMALL TO MEDIUM-SIZED CONTAINER MANUFACTURED THEREFROM

1. CROSS-REFERENCE TO RELATED APPLICATIONS

This application claims priority under 35 U.S.C. § 119 to Korean Patent Application No. 10-2022-0104064, filed on 2022 Aug. 19, in the Korean Intellectual Property Office, the disclosure of which is incorporated herein by reference in its entirety.

2. FIELD

The following disclosure relates to a polymer composition for manufacturing a small to medium-sized container including a high-density polyethylene (HDPE) recovered from a secondary battery separator and a small to medium-sized container manufactured therefrom.

3. BACKGROUND

As the use of secondary batteries increases, so does the waste that is generated when they are discarded at the end of battery lifespan. To lessen the environmental impact of this waste, methods for recycling secondary battery waste are being developed.

One of the less-often recycled parts of secondary batteries is the secondary battery separator. Improper handling of waste separators has been identified as one cause of environmental pollution. One hurdle preventing recycling of waste separators has been the sub-optimal properties of separators, such as low elongation at break and low flexural modulus. Processability also tends to be poor due to low melt index.

Therefore, there is a need in the art for the development of recycling the polyethylene obtained from waste separators and converting the polyethylene into a composition that can be converted into other materials.

4. SUMMARY

An embodiment of the present invention is directed to providing an environmentally friendly polymer composition for manufacturing a small to medium-sized container which includes a high-density polyethylene (HDPE) recovered from a secondary battery separator, has excellent mechanical properties such as flexural modulus, tensile strength at yield, and elongation, and has excellent processability.

Another embodiment of the present invention is directed to providing a small to medium-sized container manufactured by molding the polymer composition for manufacturing a small to medium-sized container.

Still another embodiment of the present invention is directed to providing a method of recycling a waste separator for a secondary battery to prepare a polymer composition having excellent processability and molding the composition to manufacture a small to medium-sized container having excellent mechanical properties.

In order to achieve the object in the present disclosure, endless research was repeated for preparing an environmentally friendly polymer composition for manufacturing a small to medium-sized container including HDPE recovered from a secondary battery separator, and as a result, it was found that when a new material satisfying certain conditions is included, a polymer composition having excellent mechanical properties such as processability, flexural modulus, tensile strength at yield, and elongation in manufacturing a small to medium-sized container may be prepared, thereby completing the present invention.

In one aspect, the present disclosure provides a polymer composition for manufacturing a small to medium-sized container includes: comprising a) a first HDPE and b) a second HDPE, and wherein the polymer composition satisfies Equation 1:

$$-1 < \frac{x}{100} * \log(MI_a) + \frac{y}{100} * \log(MI_b) < 0 \quad \text{(Equation 1)}$$

wherein x is a weight percentage of the first HDPE in the polymer composition for manufacturing a small to medium-sized container, y is a weight percentage of the second HDPE in the polymer composition for manufacturing a small to medium-sized container, $MI_a$ is the melt flow index (MFI) of the first HDPE, $MI_b$ is the MFI of the second HDPE, wherein MFI is measured in accordance with American Society for Testing and Materials standard ASTM D1238-10 (MFI measured at 190° C. at 2.16 kg). In one embodiment, the first HDPE comprises HDPE recovered from a separator for a secondary battery or the manufacture of a secondary battery. In one embodiment, the second HDPE has a density of about 0.930 g/cm³ to about 0.970 g/cm³.

In one embodiment, the first HDPE of the polymer composition for manufacturing a small to medium-sized container has a weight average molecular weight ($M_w$) of about 100,000 g/mol to about 1,000,000 g/mol. In one embodiment, the first HDPE has a number average molecular weight ($M_n$) of about 10,000 g/mol to about 500,000 g/mol. In one embodiment, the first HDPE has a PDI of about 2 to about 30. In one embodiment, first HDPE has an MFI of about 0.01 g/10 min to 0.2 g/10 min. In one embodiment, the first HDPE has a melting point ($T_m$) of about 100° C. or more. In one embodiment, the first HDPE has a flexural modulus of about 5,000 kg/cm² to about 15,000 kg/cm². In one embodiment, the first HDPE has a tensile strength at yield of about 200 kg/cm² to about 400 kg/cm². In one embodiment, the first HDPE has an elongation at break of at least about 300%. In one embodiment, the first HDPE has an Izod impact strength at room temperature (23±2° C.) of about 50 kgf cm/cm or more. In one embodiment, the second HDPE has an $M_w$ of about 50,000 g/mol to about 500,000 g/mol.

In one embodiment, the second HDPE of the polymer composition for manufacturing a small to medium-sized container has an $M_n$ of about 10,000 g/mol to about 250,000 g/mol. In one embodiment, the second HDPE has an MFI of about 0.25 g/10 min to about 1.5 g/10 min. In one embodiment, the second HDPE has a polydispersity index (PDI) of at least about 6. In one embodiment, the second HDPE has a flexural modulus of at least about 9,000 kg/cm². In one embodiment, the MFI of the first HDPE ($MI_a$) and the MFI of the second HDPE ($MI_b$) satisfy Equation 2:

$$0.15 \leq MI_b - MI_a \leq 5 \quad \text{(Equation 2).}$$

In one embodiment, the second HDPE of the polymer composition for manufacturing a small to medium-sized container has an MFI of about 0.1 g/10 min to about 5 g/10 min. In one the second HDPE has a melting point (Tm) of about 100° C. or more. In one embodiment, the second HDPE has a tensile strength at yield of about 100 kgf/cm² to about 500 kgf/cm². In one embodiment, the second HDPE has an elongation at break of at least about 300%. In one embodiment, the second HDPE has a flexural modulus of about 5000 kg/cm² to about 50,000 kg/cm². In one embodiment, the second HDPE has an environmental stress crack resistance (ESCR) of about 10 hours or more. In one embodiment, the second HDPE has an Izod impact strength at room temperature (23±2° C.) of about 1 kgf cm/cm or more.

In one embodiment, the polymer composition for manufacturing a small to medium-sized container comprises about 20 wt. % to about 60 wt. % of the first HDPE and about 40 wt. % to about 80 wt. % of the second HDPE. In one embodiment, the polymer composition for manufacturing a small to medium-sized container satisfies Equation 1.1:

$$-0.7 < \frac{x}{100} * \log(MI_a) + \frac{y}{100} * \log(MI_b) < -0.3. \quad \text{(Equation 1.1)}$$

In one embodiment, the polymer composition for manufacturing a small to medium-sized container has a density of about 0.930 g/cm³ to about 0.990 g/cm³. In one embodiment, the polymer composition has an MFI of about 0.1 g/10 min to about 1.0 g/10 min. In one embodiment, the polymer composition has an MFI of about 0.1 g/10 min to about 0.5 g/10 min. In one embodiment, the polymer composition has a tensile strength at yield of at least about 180 kg/cm². In one embodiment, the polymer composition has a tensile strength at yield of at least about 240 kg/cm². In one embodiment, the polymer composition has an elongation at break of at least 300%. In one embodiment, the polymer composition has an environmental stress crack resistance (ESCR) of 30 hours or more, as measured in accordance with ASTM D1693. In one embodiment, the polymer composition has an Izod impact strength measured at a temperature of at least about 23±2° C. of 10 kgf·cm/cm. In one embodiment, the polymer composition has a flexural modulus of at least about 7,500 kg/cm². In one embodiment, the polymer composition further comprises one or more of an antioxidant, a UV absorber, a UV stabilizer, a lubricant, a pigment, a colorant, a filler, a plasticizer, a flow agent, an antistatic agent, a flame retardant, a slap agent, and an anti-block agent. In one embodiment, the polymer composition is in the form of a pellet or nurdle.

In another aspect, the present disclosure provides a small to medium-sized container comprising the polymer composition as described in any embodiment herein.

In another aspect, the present disclosure provides a method of manufacturing a small to medium-sized container as described herein, the method comprising (a) combining polymer composition of a first HDPE and a second HDPE, to manufacture a pre-production polymer, and (b) subjecting a pre-production polymer to conditions effective to generate a small to medium-sized container, wherein the first HDPE and second HDPE are selected to satisfy Equation 1:

$$-1 < \frac{x}{100} * \log(MI_a) + \frac{y}{100} * \log(MI_b) < 0 \quad \text{(Equation 1)}$$

wherein x is the weight percentage of the first HDPE in the polymer composition for manufacturing a small to medium-sized container, y is the weight percentage of the second HDPE in the polymer composition for manufacturing a small to medium-sized container, $MI_a$ is the MFI of the first HDPE, $MI_b$ is the MFI of the second HDPE, wherein MFI is measured in accordance with American Society for Testing and Materials standard ASTM D1238-10 (MFI measured at 190° C. at 2.16 kg), wherein the first HDPE comprises HDPE recovered from a separator for a secondary battery, and wherein the second HDPE has a density of about 0.930 g/cm³ to about 0.970 g/cm³.

In one embodiment, the first HDPE comprises HDPE recovered from separators of a secondary battery by removing any inorganic coating layers, or HDPE recovered during the manufacture of a separator for a secondary battery, such as scraps produced, separator ends recovered after trimming. In one embodiment, the method further comprises an initial step of extruding an HDPE recovered from a second battery separator or from material generated during the manufacture thereof to provide the pre-production polymer. In one embodiment, the conditions effective comprise one or more of injection-molding, blow-molding, and profile extrusion.

5. BRIEF DESCRIPTION OF THE DRAWINGS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The FIGURE provides an image of exemplary small to medium-sized container manufactured by blow-molding polymer compositions as described herein.

6. DETAILED DESCRIPTION

Figure 1:
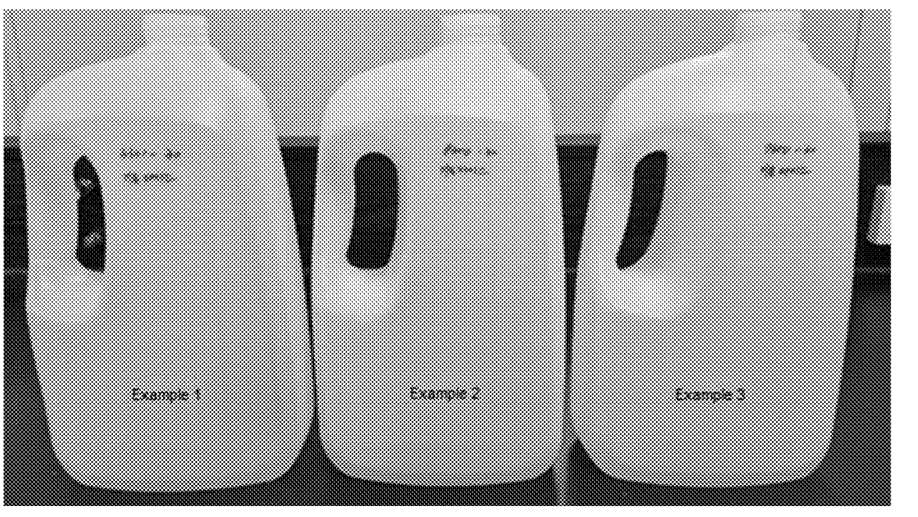

It will be readily understood that the components of the embodiments, as generally described and illustrated in the FIGURES herein, may be arranged and designed in a wide variety of different configurations in addition to the described example embodiments. Thus, the following more detailed description of the example embodiments, as represented in the FIGURES, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an," and "the" include plural references unless the context clearly dictates otherwise. Thus, for example, reference to "a light source" includes a plurality of such light sources and equivalents thereof known to those skilled in the art, and so forth, and reference to "the light source" is a reference to one or more such light sources and equivalents thereof known to those skilled in the art, and so forth.

The term "about" is used to mean within 10% of the value to which it refers. For example, "about 50" refers to a numerical range of 45 to 55.

Unless otherwise defined, all technical terms and scientific terms have the same meanings as those commonly understood by one of those skilled in the art to which the present disclosure pertains.

The polymer compositions described herein may be described in terms of weight percent of various components thereof. Unless otherwise indicated, all percentages are based on weight (wt. %) of a particular component with reference to the total composition of which it is part.

All numerical ranges used in the present specification may include all values within the range including the lower limit and the upper limit, increments logically derived in a form and span in a defined range, all double limited values, and all possible combinations of the upper limit and the lower limit in the numerical range defined in different forms. Unless otherwise particularly defined in the present specification, values which may be outside a numerical range due to experimental error or rounding of a value are also included in the defined numerical range.

In developing methods for recycling batteries, a great deal of effort has been expended on reclaiming and reusing the valuable metals typically used in battery anodes and/or cathodes. Substantially less effort has been placed on recycling other components of batteries, such as the plastic components of the battery casing and separator. The separator is a permeable, often polymeric, membrane placed between an anode and a cathode of a battery. Typically, separators comprise materials such as nonwoven fabrics (e.g., cotton, nylon, polyesters, glass), polymer films (e.g., polyethylene, polypropylene, poly(tetrafluoroethylene), polyvinyl chloride), ceramic, and naturally occurring substances (e.g., rubber, asbestos, wool). Polymers used in separators typically exhibit poor processability due to low MFI, low elongation, and low flexural modulus and therefore tend to be difficult to recycle into new materials. The present disclosure provides a method for recycling a separator polymer by combining a recovered separator with a second polymer to generate a polymer composition having properties exhibiting improved processability suitable for polymer manufacturing.

In one aspect, the present disclosure provides a polymer composition that may be used in the manufacture of a small to medium-sized container. In one embodiment, the small to medium-sized container has a volume capacity of about 20 L or less. The polymer composition for manufacturing the small to medium-sized container may comprise a) a first HDPE and b) a second HDPE, wherein the polymer composition satisfies Equation 1, shown below:

$$-1 < \frac{x}{100} * \log(MI_a) + \frac{y}{100} * \log(MI_b) < 0 \quad \text{(Equation 1)}$$

wherein x is the weight percentage of the first HDPE in the polymer composition, y is the weight percentage of the second HDPE in the polymer composition, $MI_a$ is the MFI of the first HDPE, $MI_b$ is the MFI of the second HDPE, wherein the MFI is measured in accordance with American Society for Testing and Materials standard ASTM D1238-10 (MFI measured at 190° C. at 2.16 kg). In one embodiment, the polymer composition for manufacturing a small to medium-sized container satisfies Equation 1.1, shown below:

$$-0.7 < \frac{x}{100} * \log(MI_a) + \frac{y}{100} * \log(MI_b) < -0.3. \quad \text{(Equation 1.1)}$$

In one embodiment, the second HDPE has a density of about 0.930 g/cm³ to about 0.970 g/cm³. In one embodiment, the polymer composition for manufacturing a small to medium-sized container comprises HDPE recovered from a separator for a secondary battery. In one embodiment, the first HDPE comprises HDPE recovered from a separator for a secondary battery. In one embodiment, the secondary battery is a lithium secondary battery. In one embodiment, the separator for a secondary battery may be recovered and used in the polymer compositions as disclosed herein by removing any inorganic coating layers from the separators. In one embodiment, the polymer composition for manufacturing a small to medium-sized container comprises HDPE recovered during the manufacture of a separator for a secondary battery, such as, but not limited to, scraps produced, separator ends recovered after trimming, and the like. As will be appreciated by one of skill in the art, HDPE from secondary battery separators typically exhibit poor processability due to low MFI, low elongation, and low flexural modulus, and are therefore difficult to recycle. Advantageously, however, HDPE recovered from a battery separator may be incorporated into a polymer composition for manufacturing a small to medium-sized container according to the methods described herein, that exhibits excellent processability and excellent mechanical strength.

In one embodiment, the polymer composition for manufacturing a small to medium-sized container is a pre-production polymer composition comprising a plurality of pellets or nurdles comprising the first HDPE ("first HDPE pre-production polymer") and the second HDPE ("second HDPE pre-production polymer"). In one embodiment, the polymer composition for manufacturing a small to medium-sized container is a pre-production polymer comprising a plurality of pellets or nurdles comprising both the first HDPE and second HDPE. In one embodiment, the polymer composition for manufacturing a small to medium-sized container is a mixture of the first HDPE and second HDPE that is suitable for subsequent processing into a pre-production polymer, such as pellets or nurdles.

First HDPE

In one embodiment, the first HDPE in the polymer composition for manufacturing a small to medium-sized container has a weight average molecular weight ($M_w$) of about 100,000 g/mol to about 1,000,000 g/mol, such as about 150,000 g/mol to about 700,000 g/mol, or about 200,000 g/mol to about 500,000 g/mol. In one embodiment, the first HDPE in the polymer composition has a number average molecular weight ($M_n$) of about 10,000 g/mol to about 500,000 g/mol, such as about 20,000 g/mol to about 400,000 g/mol, or about 30,000 g/mol to about 300,000 g/mol. In one embodiment, the first HDPE in the polymer composition has a polydispersity index (PDI, $M_w/M_n$) of about 2 to about 30, such as about 3 to about 25, or about 4 to about 20. In one embodiment, the first HDPE need not have any of the disclosed $M_w$, $M_n$, or PDI, provided that the first HDPE has been recovered from a secondary battery separator.

In one embodiment, the first HDPE in the polymer composition for manufacturing a small to medium-sized container has an MFI of about 0.001 g/10 min to about 0.5 g/10 min, such as about 0.01 g/10 min to about 0.20 g/10 min, or about 0.01 g/10 min to about 0.10 g/10 min.

In one embodiment, the first HDPE in the polymer composition for manufacturing a small to medium-sized container has a density of about 0.920 g/cm$^3$ to about 0.990 g/cm$^3$, such as about 0.930 g/cm$^3$ to about 0.970 g/cm$^3$, or about 0.940 g/cm$^3$ to about 0.960 g/cm$^3$.

In one embodiment, the first HDPE in the polymer composition for manufacturing a small to medium-sized container has a melting point ($T_m$) of about 100° C. to about 200° C., such as about 120° C. to about 180° C., or about 130° C. to about 180° C.

In one embodiment, the first HDPE in the polymer composition for manufacturing a small to medium-sized container has a tensile strength at yield of about 150 kgf/cm$^2$ to about 450 kgf/cm$^2$, such as about 200 kgf/cm$^2$ to about 400 kgf/cm$^2$, or about 220 kgf/cm$^2$ to about 350 kgf/cm$^2$.

In one embodiment, the first HDPE in the polymer composition for manufacturing a small to medium-sized container has an elongation at break of about 300% or more, such as about 350% to about 2000%, or about 400% to about 1500%.

In one embodiment, the first HDPE in the polymer composition for manufacturing a small to medium-sized container has a flexural modulus of about 2,000 kg/cm$^2$ to about 25,000 kg/cm$^2$, such as about 3,000 kg/cm$^2$ to about 20,000 kg/cm$^2$, or about 5,000 kg/cm$^2$ to about 15,000 kg/cm$^2$.

In one embodiment, the first HDPE in the polymer composition for manufacturing a small to medium-sized container has an Izod impact strength at room temperature (23±2° C.) of about 50 kgf cm/cm or more, such as about 80 kgf cm/cm or more. The maximum Izod impact strength for the first HDPE is not particularly limited, however, in any embodiment, has an Izod impact strength of 200 kgf cm/cm or less.

Second HDPE

In one embodiment, the second HDPE in the polymer composition for manufacturing a small to medium-sized container has an $M_w$ of about 50,000 g/mol to about 500,000 g/mol, such as about 80,000 g/mol to about 400,000 g/mol, or about 100,000 g/mol to about 300,000 g/mol. In one embodiment, the second HDPE in the polymer composition for manufacturing a small to medium-sized container has an $M_n$ of about 10,000 g/mol to about 250,000 g/mol, such as about 15,000 g/mol to about 200,000 g/mol, or about 20,000 g/mol to about 150,000 g/mol. In one embodiment, the second HDPE is commercially available.

In one embodiment, the MFI of the first HDPE ($MI_a$) and the MFI of the second HDPE ($MI_b$) satisfies Equation 2 shown below:

$$0.15 \leq MI_b - MI_a \leq 5 \quad \text{(Equation 2)}$$

In one embodiment, the MFI of the first HDPE ($MI_a$) and the MFI of the second HDPE ($MI_b$) satisfies Equation 2.1 shown below:

$$0.25 \leq MI_b - MI_a \leq 1.5 \quad \text{(Equation 2.1)}$$

Advantageously, by selecting and using HDPE materials that have MFIs satisfying Equation 2 or Equation 2.1 may result in a polymer composition suitable for the efficient manufacturing a small to medium sized container as described herein. In one embodiment, the polymer composition may be used to manufacture a small to medium sized container having a low defect rate.

The MFI of the second HDPE is not particularly limited, provided that it has an MFI that, together with the MFI of the first HDPE, satisfies Equation 2. However, in one embodiment, the second HDPE in the polymer composition has an MFI of about 0.1 g/10 min to about 5 g/10 min, such as about 0.25 g/10 min to about 1.5 g/10 min, or about 0.5 g/10 min to about 1 g/10 min.

A polymer composition for manufacturing a small to medium-sized container comprising a first HDPE and a second HDPE as described herein that additionally satisfies Equation 1 and Equation 2 may exhibit excellent processability properties, such as MFI, elongation, flexural modulus, and impact strength, which render the composition particularly suitable for manufacturing a small to medium-sized container as disclosed herein.

In one embodiment, the second HDPE in the polymer composition for manufacturing a small to medium-sized container has a density of about 0.930 g/cm$^3$ to about 0.970 g/cm$^3$, such as about 0.940 g/cm$^3$ to about 0.970 g/cm$^3$, or about 0.950 g/cm$^3$ to about 0.970 g/cm$^3$.

In one embodiment, the second HDPE in the polymer composition for manufacturing a small to medium-sized container has a polydispersity index (PDI) of about 3 or more, such as about 4 or more, or about 5 to about 20.

In one embodiment, the second HDPE in the polymer composition for manufacturing a small to medium-sized container has a melting point ($T_m$) of about 100° C. or more, such as about 120° C. or more, or about 125° C. to about 150° C., but is not limited thereto.

In one embodiment, the second HDPE in the polymer composition for manufacturing a small to medium-sized container has a tensile strength at yield of about 100 kgf/cm$^2$ to about 500 kgf/cm$^2$, such as about 200 kgf/cm$^2$ to about 400 kgf/cm$^2$, or about 250 kgf/cm$^2$ to about 350 kgf/cm$^2$, but is not limited thereto.

In one embodiment, the second HDPE in the polymer composition for manufacturing a small to medium-sized container has an elongation at break of at least about 300%, such as about 350% to about 2000%, about 400% to about 1500%, or about 400% to about 1000%.

In one embodiment, the second HDPE in the polymer composition for manufacturing a small to medium-sized container has an Izod impact strength at room temperature (23±2° C.) of about 1 kgf cm/cm or more, such as about 5 kgf cm/cm or more. The maximum Izod impact strength for the second HDPE is not particularly limited, however, in any embodiment, has an Izod impact strength of about 200 kgf cm/cm or less.

In one embodiment, the second HDPE in the polymer composition for manufacturing a small to medium-sized container has a flexural modulus of about 5000 kg/cm$^2$ to about 50,000 kg/cm$^2$, such as about 7000 kg/cm$^2$ to about 30,000 kg/cm$^2$, or about 9000 kg/cm$^2$ to about 15,000 kg/cm$^2$. In one embodiment, the second HDPE in the polymer composition has a flexural modulus of about 9000 kg/cm$^2$ or more.

In one embodiment, the second HDPE in the polymer composition for manufacturing a small to medium-sized container has an environmental stress crack resistance (ESCR) of about 10 hours or more, such as about 50 hours or more. The maximum ESCR for the second HDPE in the polymer composition is not particularly limited.

A polymer composition for manufacturing a small to medium-sized container comprising a first HDPE and second HDPE, as described herein, may exhibit advantageous or improved properties compared with other polymer compositions. For example, in one embodiment, a polymer composition for manufacturing a small to medium-sized container comprising a first HDPE and second HDPE, as described herein, may generate less fine powder or fumes, thereby imparting excellent process stability. Despite using HDPE recovered from a plastic having poor processability properties (i.e., battery separator having low MFI and poor mechanical properties) in the first HDPE, the resulting polymer composition may exhibit an MFI particularly suited for manufacturing a small to medium-sized container according to the methods disclosed herein. Additionally, recycling HDPE from a battery separator impacts the environment beneficially. A small to medium-sized container manufacture from the polymer compositions described herein may further exhibit excellent mechanical properties such as elongation at break and flexural modulus.

In one embodiment, a polymer composition for manufacturing a small to medium-sized container comprises about 20 wt. % to about 60 wt. % of the first HDPE and about 40 wt. % to about 80 wt. % of the second HDPE, such as about 30 wt. % to about 50 wt. % of the first HDPE and about 50 wt. % to about 70 wt. % of the second HDPE. Advantageously, the range described above is satisfied, the polymer composition exhibits an MFI particularly suitable for manufacturing small to medium-sized containers that have excellent work efficiency, excellent process stability, and improved mechanical physical properties. Furthermore, as the content of the first HDPE is increased, recycling efficiency is increased, and thus, environmental friendliness may be implemented more effectively.

Polymer Composition

In one embodiment, the polymer composition for manufacturing a small to medium-sized container comprises at least about 30 wt. % of a first HDPE recovered from a secondary battery separator, and surprisingly exhibits an MFI lending to excellent work efficiency and excellent mechanical properties such as Izod impact strength, elongation, and flexural modulus.

In one embodiment, the polymer composition for manufacturing a small to medium-sized container has a density of about 0.930 g/cm$^3$ to about 0.990 g/cm$^3$, such as about 0.940 g/cm$^3$ to about 0.980 g/cm$^3$, or about 0.945 g/cm$^3$ to about 0.970 g/cm$^3$.

In one embodiment, the polymer composition for manufacturing a small to medium-sized container has an MFI of about 0.1 g/10 min to about 1.0 g/10 min, such as about 0.1 g/10 min to about 0.7 g/10 min, or about 0.1 g/10 min to about 0.5 g/10 min. Advantageously, when the range is satisfied, the composition has excellent processability thereby imparting improved work efficiency and a low rate of defects.

In one embodiment, the polymer composition for manufacturing a small to medium-sized container has a tensile strength at yield of about 180 kg/cm$^2$ or more, such as about 220 kg/cm$^2$ or more, about 250 kg/cm$^2$ or more, or about 260 kg/cm$^2$ or more. The maximum tensile strength at yield of the polymer composition is not particularly limited, however, in any embodiment, the polymer composition has a tensile strength at yield of about 2000 kg/cm$^2$ or less.

In one embodiment, the polymer composition for manufacturing a small to medium-sized container has an elongation at break of about 300% or more, such as about 350% or more, about 400% or more, or about 500% or more. The maximum elongation at break of the polymer composition is not particularly limited, however, in any embodiment, the polymer composition has an elongation at break of about 2000% or less.

In one embodiment, the polymer composition for manufacturing a small to medium-sized container has an ESCR of about 10 hours or more, such as about 30 hours or more, about 50 hours or more, or about 100 hours or more. The maximum ESCR is not particularly limited as longer the ESCR properties contribute to excellent physical properties.

In one embodiment, the polymer composition for manufacturing a small to medium-sized container has an Izod impact strength measured at a temperature of 23±2° C. of about 10 kgf cm/cm or more, such as about 20 kgf cm/cm or more, or about 20 kgf cm/cm to about 50 kgf cm/cm.

In one embodiment, the polymer composition for manufacturing a small to medium-sized container has a flexural modulus of about 7,500/cm$^2$ or more, such as about 9,000/cm$^2$ or more, or about 10,000/cm$^2$ or more. The maximum flexural modulus of the polymer composition is not particularly limited, however in one embodiment, the polymer composition has a flexural modulus of about 100,000/cm$^2$ or less.

In one embodiment, a polymer composition for manufacturing a small to medium-sized container comprising a first HDPE and a second HDPE, as described herein, may further comprises one or more additives. In one embodiment, a polymer composition further comprises one or more of an antioxidant, a UV absorber, a UV stabilizer, a lubricant, a pigment, a colorant, a filler, a plasticizer, a flow agent, an antistatic agent, a flame retardant, a slap agent, and an anti-block agent. One of skill in the art will be familiar with the various additives that may be used, including appropriate amounts and methods for incorporation to a polymer composition. In one embodiment, the polymer composition comprises a UV absorber. In one embodiment, the UV adsorber is a benzotriazine-based or a benzotriazole-based UV absorber. In one embodiment, the polymer composition comprises a UV stabilizer. In one embodiment, the polymer composition comprises a UV stabilizer selected from the group consisting of 2-(2'-hydroxymethyl phenyl)benzotriazole, 2-(2'-hydroxy-3',5'-bis(α,α-dimethylbenzylphenyl))benzotriazole, 2-(2'-hydroxy-3',5'-dibutylphenyl)benzotriazole, 2-(2'-hydroxy-3'-tert-butyl-5'-methylphenyl)-5-chlorobenzotriazole, and 2-(2'-hydroxy-3',5'-di-tert-butylphenyl)-5-chlorobenzotriazole, bis-ethylhexyloxyphenol methoxyphenyl triazine, and any combination of the foregoing. In one embodiment, the UV stabilizer is a HALS-based UV stabilizer.

In one embodiment, the polymer composition for manufacturing a small to medium-sized container further comprises an antioxidant, such as one or both of a primary and secondary antioxidant. In one embodiment, the polymer composition comprises one or more antioxidants selected from the group consisting of dibutyl hydroxytoluene (BHT) and tris(nonylphenyl)phosphite (TNPP).

In one embodiment, the polymer composition for manufacturing a small to medium-sized container further comprises a lubricant to improve flowability and suppress frictional heat during manufacturing of the pre-production polymer and/or polymer article. In one embodiment, the polymer composition further comprise a lubricant selected from the group consisting of a hydrocarbon-based compound, a carboxylic acid-based compound, an alcohol-based compound, an amide-based compound, an ester-based compound, or any combination of the foregoing.

In another aspect, the present disclosure provides a pre-production polymer comprising the polymer composition for manufacturing a small to medium-sized container as described herein. In one embodiment, the pre-production polymer is a pre-molded body cut into a uniform size, such as a pellet or nurdle, which may be manufactured according to commonly used methods, such as extrusion or injection. The size and shape of the pellet or nurdles are not particularly limited.

In yet another aspect, the present disclosure provides a small to medium-sized container comprising the polymer composition as described herein. In particular, the present disclosure provides a small to medium-sized container comprising a) a first HDPE and b) a second HDPE, wherein the first HDPE and second HDPE satisfies Equation 1. In one embodiment, the second HDPE of the polymer composition has a density of about 0.930 g/cm$^3$ to about 0.970 g/cm$^3$. In one embodiment, the polymer composition comprises HDPE recovered from a separator for a secondary battery. In one embodiment, the polymer composition for manufacturing a small to medium-sized container comprises HDPE recovered from two or more separators of secondary batteries.

In one embodiment, the first HDPE of the polymer composition for manufacturing a small to medium-sized container has an $M_w$ of about 100,000 g/mol to about 1,000,000 g/mol, an $M_n$ of about 10,000 g/mol to about 500,000 g/mol, an MFI of about 0.001 g/10 min to about 0.5 g/10 min, a density of about of about 0.920 g/cm$^3$ to about 0.990 g/cm$^3$, a PDI of about 2 to about 30, a melting point of at least about 100° C., a tensile strength at yield of about 150 kgf/cm$^2$ to about 450 kgf/cm$^2$, an elongation at break of at least about 300%, an Izod impact strength at room temperature (23±2° C.) of at least about 50 kgf cm/cm, a flexural modulus of about 2,000 kgf/cm$^2$ to about 25,000 kgf/cm$^2$, or any combination of the foregoing.

In one embodiment, the second HDPE of the polymer composition for manufacturing a small to medium-sized container has an $M_w$ of about 50,000 g/mol to about 500,000 g/mol, an $M_n$ of about 10,000 g/mol to about 250,000 g/mol, an MFI that complements the MFI of the first HDPE according to one or both of Equations 2 or 2.2, a PDI of at least about 3, a melting point ($T_m$) of at least about 100° C., a tensile strength at yield of about 100 kgf/cm$^2$ to about 500 kgf/cm$^2$, an elongation at break of at least about 300%, an Izod impact strength at room temperature (23±2° C.) of at least about 1 kgf cm/cm, a flexural modulus of about 5000 kg/cm$^2$ to about 50,000 kg/cm$^2$, an ESCR of at least about 10 hours, or any combination of the foregoing.

In one embodiment, the small to medium-sized container comprises a polymer composition that comprises at least about 30 wt. % of a first HDPE recovered from one or more secondary battery separators. In one embodiment, the small to medium-sized container comprises a polymer composition that has a density of about 0.930 g/cm$^3$ to about 0.990 g/cm$^3$, an MFI of about 0.1 g/10 min to about 1.0 g/10 min, a tensile strength at yield of at least about 180 kg/cm$^2$, an elongation at break of at least about 300%, an Izod impact strength measured at a temperature of 23±2° C. of at least about 10 kgf cm/cm, a flexural modulus of at least about 7,500/cm$^2$, an ESCR of at least about 10 hours, or any combination of the foregoing. In one embodiment, the small to medium-sized container, in addition to the first and second HDPE, further comprise one or more additives, such as but not limited to, an antioxidant, a UV absorber, a UV stabilizer, a lubricant, a pigment, a colorant, a filler, a plasticizer, a flow agent, an antistatic agent, a flame retardant, a slap agent, and/or an anti-block agent, each of which are described herein.

In one embodiment, small to medium-sized container is a polymer-based molded article such as, but not limited to, a low volume container, a container for storage or preservation, an airtight container, or a packaging container. In one embodiment, the small to medium-sized container has a volume capacity of about 20 L or less.

Advantageously, by using a first HDPE and a second HDPE with properties described herein, a small to medium-sized container that has excellent tensile strength at yield, elongation, flexural strength, impact strength, and/or ESCR may be manufactured. Additionally, a small to medium-sized container comprising a first HDPE comprising HDPE recovered from one or more battery separators or from the manufacturing thereof, reduces environmental impact manufacturing the small to medium-sized container.

Methods of Manufacture

In another aspect, the present disclosure provides a method of manufacturing a pre-production polymer for manufacturing a small to medium-sized container as described herein, the method comprising combining a first HDPE recovered from a second battery separator and a second HDPE to form a pre-production polymer composition, wherein the first HDPE and second HDPE are selected to satisfy Equation land wherein the second HDPE has a density of about 0.930 g/cm$^3$ to about 0.970 g/cm$^3$.

In one embodiment, the first HDPE is in the form of or is comprised within a first HDPE pre-production polymer, for example, a plurality of pellets or nurdles. In one embodiment, the second HDPE in the form of a second HDPE pre-production polymer, for example, a plurality of pellets or nurdles.

In one embodiment, the first HDPE consists substantially of HDPE recovered from one or more separators of one or more secondary batteries. In one embodiment, the first HDPE consists of HDPE recovered from one or more separators of one or more secondary batteries. In one embodiment, the secondary battery is a lithium secondary battery. In one embodiment, the separator for a secondary battery may be recovered and used in the polymer compositions as disclosed herein by removing any inorganic coating layers from the separators. In one embodiment, the first HDPE comprises HDPE recovered during the manufacture of a separator for a secondary battery, such as, but not limited to, scraps produced, separator ends recovered after trimming, and the like.

The first HDPE recovered from a second battery separator by any of the foregoing may be subsequently processed by crushing under sufficient conditions to obtain a first HDPE pre-production polymer. In one embodiment, the first HDPE pre-production polymer may be a pellet. In one embodiment, the sufficient conditions comprise subjecting the first HDPE to extrusion at a suitable processing temperature, such as at a temperature of about 180° C. to 230° C. In one embodiment, the resulting first HDPE pre-production polymer may be dried and combined with a second HDPE, such as a second HDPE pre-production polymer, to yield the pre-production polymer composition.

In one embodiment, the method may further comprise subjecting the pre-production polymer to conditions effective to generate a small to medium-sized container. In one embodiment, the pre-production polymer is a plurality of polymer-based pellets or nurdles. In one embodiment, the pre-production polymer is blow-molded into a small to medium-sized container.

In one embodiment, the secondary battery from which the first HDPE is recovered is a lithium secondary battery. In one embodiment, the separator for a secondary battery is recovered and used in the polymer compositions for manufacturing a small to medium-sized container as disclosed herein by removing any inorganic coating layers from the separators. In one embodiment, the polymer composition for manufacturing a small to medium-sized container comprises HDPE recovered during the manufacture of a separator for a secondary battery, such as, but not limited to, scraps produced, separator ends recovered after trimming, and the like.

In some embodiments, a method of preparing a small to medium-sized container comprises an initial step chemically or physically processing the first HDPE, such as to remove impurities, before preparing the polymer or pre-production polymer composition. One of skill in the art will be familiar with various processes that may be used to improve the processibility of recovered and/or recycled HDPE.

In another aspect, the present disclosure provides a method of manufacturing a small to medium-sized container comprising a polymer composition for manufacturing the same as described herein. In one embodiment, the method of manufacturing a small to medium-sized container comprises providing a pre-production polymer composition comprising a first HDPE (such as a first HDPE pre-production polymer) and a second HDPE (such as a second HDPE pre-production polymer), as described herein, and contacting the pre-production polymer composition to conditions effective to manufacture the small to medium-sized container. In one embodiment, the pre-production polymer composition is subjected to a molding method, such as, but not limited to, injection molding, blow-molding, and extrusion molding. One of skill in the art will be familiar with various methods for manufacturing small to medium-sized container from pre-production polymer composition as described herein. In one embodiment, the pre-production polymer composition is subjected to blow-molding. In one embodiment, small to medium-sized container is a polymer-based molded article such as, but not limited to, a low volume container, a container for storage or preservation, an airtight container, or a packaging container. In one embodiment, the small to medium-sized container has a volume capacity of about 20 L or less.

Advantageously, manufacturing a small to medium-sized container using recovered waste material from or generated during the manufacture of a separator for a secondary battery is environmentally friendly. Furthermore, though the first HDPE recovered from the secondary battery is difficult to mold and shows insignificant physical properties, the second high-density polyethylene is selected based on certain characteristics such that its combination with the first HDPE results in a polymer composition having improved processability and excellent mechanical properties suitable for manufacturing a small to medium-sized container.

7. EXAMPLES

Example 1: Methods of Characterization

Density [g/cm$^3$]: A calibration curve of density values versus height was created based on a standard specimen with known density using a linear density gradient tube using a vertical column. Thereafter an unknown sample specimen was floated in the column and the float height was compared to the calibration curve.

Molecular weight ($M_w$, $M_n$) [g/mol]: Gel Permeation Chromatography (GPC, Agilent, Infinity 1260) was used to measure weight average molecular weight ($M_w$) and a number average molecular weight ($M_n$). Polydispersity index (PDI) value was calculated as $M_w$ divided by $M_n$. Other specific conditions are as follows.

| | |
|---|---|
| Column(s) | Guard (1): PLgel Olexis available from Agilent 7.5 × 300 mm, 13 µm; Analytical (3): PLgel Olexis available from Agilent 7.5 × 300 mm, 13 µm |
| Detector | Refractive Index Detector; 1260 Infinity II High-Temperature GPC System available from Agilent |
| Column Temperature | 160° C. |
| Flow Rate | 1 mL/min |
| Solvent | 1,2,4-trichlorobenzene |
| Standard | polystyrene |

Samples were prepared by dissolving 2 mg to 5 mg of a sample in 1 mL of 1,2,4-trichlorobenzene with 200 ppm of BHT. Samples were stirred at 150° C. for 4 hours using a preprocessor (Agilent PL-SP 260 VS Sample Preparation System and 200 µL of the produced solution was injected to GPC.

Melt flow index (MFI) [g/10 min]: MFI was measured in accordance with ASTM D1238-10 at a temperature of 190° C. at 2.16 kg. When MFI was measured to be 0.05 or less, a further analysis was conducted but at a weight of 21.6 kg. The resulting value was divided by 95, which is a flow rate ratio (FRR) factor.

Tensile strength at yield and elongation at break [kgf/cm$^2$, %]: Tensile strength at yield and elongation at break were measured in accordance with ASTM D638, Type IV. Specifically, measurements were obtained under the speed condition of 50 mm/min after conditioning a specimen having a thickness of 2.0 mm at 23° C./50% relative humidity (RH) for 40 hours.

Izod impact strength [kgf cm/cm]: Izod impact strength was measured in accordance with ASTM D256. A sample specimen, manufactured under the conditions of Dimension A (10.16±0.05 mm), was conditioned at 23° C./50% RH for 40 hours after which the Izod impact strength was measured at room temperature (23±2° C.).

Flexural modulus [kg/cm$^2$]: A sample was conditioned at 23° C./50% RH for 40 hours after which flexural strength was measured in accordance with the Procedure condition B (0.1 mm/mm/min) of ASTM D790.

Environmental stress crack resistance (ESCR) [hour]: ESCR was measured in accordance with Condition B, F50 (bath temperature: 50° C.) of ASTM D1693.

Example 2: Preparation of First HDPE

Scraps produced in the secondary battery separator manufacturing process using HDPE as a raw material or a separator end sample recovered after trimming were crushed into a size of 5 cm×5 cm to obtain a pellet by an extruder at a processing temperature of 230° C. Thereafter, the pellet was sufficiently dried to manufacture a first HDPE pellet.

Example 3: Preparation of Samples

Samples 1-4 and Comparative Samples 1-2 were prepared as follows using YUZEK™ HDPE from SK Chemicals Co., Ltd.:

Sample 1: 30% of First HDPE from Example 2+70% YUZEX™ 8300
Sample 2: 30% of First HDPE from Example 2+70% YUZEX™ 7300
Sample 3: 30% of First HDPE from Example 2+70% YUZEX™ 3301
Sample 4: 30% of First HDPE from Example 2+70% YUZEX™ 2520
Comparative Sample 1: 30% of First HDPE from Example 2+70% YUZEX™ 6100
Comparative Sample 2: 30% of First HDPE from Example 2+70% YUZEX™ 7220

Physical properties of each of the first HDPE prepared according to Example 2, and each of the YUZEK™ HDPE were measured and are shown in the Table 1 below:

TABLE 1

|  | Example 2 - First HDPE | YUZEX™ 8300 | YUZEX™ 7300 | YUZEX™ 3301 | YUZEX™ 2520 | YUZEX™ 6100 | YUZEX™ 7200 |
| --- | --- | --- | --- | --- | --- | --- | --- |
| MFI (g/10 min) | 0.02 | 0.6 | 1 | 0.8 | 0.35 | 0.05 | 6.5 |
| MI$_b$-MI$_a$ (g/10 min) | — | 0.58 | 0.98 | 0.78 | 0.33 | 0.03 | 6.48 |
| Density (g/cm$^3$) | 0.952 | 0.963 | 0.965 | 0.955 | 0.958 | 0.953 | 0.953 |
| PDI | 4.3 | 8.5 | 10 | 8.5 | 14 | 23 | 6.0 |
| Tensile strength at yield (kgf/cm$^2$) | 288 | 300 | 240 | 230 | 280 | 260 | 220 |
| Elongation at break (%) | 787 | 1000 | 500 | 600 | >700 | 970 | >500 |
| Izod Impact Strength (kgf · cm/cm) | >60 | 7 | 8 | <60 | 15 | 20 | 10 |
| Flexural modulus (kg/cm$^2$) | 11000 | 12000 | 12000 | 9000 | 9500 | 9180 | 8500 |
| ESCR (hour) | 70 | — | 13 | >300 | >600 | >1000 | 10 |

The polymer compositions above put into a twin screw extruder, melt extruded at a processing temperature of 230° C. for a sufficient time to obtain a recycled resin pellet, and the recycled resin pellet was sufficiently dried and then melt mixed with a new resin material at a processing temperature of 220° C. to manufacture a pellet for molding by an extruder. The pellet for molding was injected or extruded to prepare a sample appropriate for each physical property evaluation standard. Physical properties of each of the first HDPE prepared according to Example 2, Samples 1-4, and Comparative Samples 1-2 were measured and are shown in the Table 2 below. For "Calculation Formula 1", the following Formula was used:

$$\frac{x}{100} * \log(MI_a) + \frac{y}{100} * \log(MI_b).$$ (Calculation Formula 1)

TABLE 2

|  | Sample 1 | Sample 2 | Sample 3 | Sample 4 | Comparative Sample 1 | Comparative Sample 2 |
|---|---|---|---|---|---|---|
| Calculation Formula 1 | −0.66 | −0.51 | −0.58 | −0.83 | −1.42 | 0.06 |
| MFI (g/10 min) | 0.11 | 0.15 | 0.13 | 0.1 | 0.04 | 1.07 |
| Density (g/cm$^3$) | 0.956 | 0.959 | 0.952 | 0.955 | 0.951 | 0.951 |
| Tensile strength at yield (kgf/cm$^2$) | 280 | 275 | 260 | 277 | 240 | 210 |
| Elongation at break (%) | 600 | 500 | 400 | 500 | 500 | 250 |
| Izod Impact Strength (kgf · cm/cm) | 30 | 25 | 25 | 20 | 35 | 18 |
| Flexural modulus (kg/cm$^2$) | 11400 | 11100 | 10000 | 10000 | 9625 | 8200 |
| ESCR (hour) | 65 | 30 | >100 | >100 | >1000 | 35 |

It was confirmed that the polymer composition of Samples 1-4, even though each comprises 30 wt. % of the first HDPE recovered from the secondary battery separator, exhibited an MFI suitable for the manufacture of a small to medium-sized container as described herein. In particular, the polymer compositions comprising the second HDPE as indicated in Table 2 and 3 exhibited significantly improved elongation at break and flexural modulus as compared with the first HDPE of Example 2, recovered from the secondary battery separator. The polymer compositions comprising the second HDPE as indicated in Table 2 also exhibited excellent tensile strength at yield and impact strength and further may effectively implement environmental friendliness by recycling a secondary battery separator.

In addition, since it was shown that the physical properties of the product conventionally used in the manufacture of a small to medium-sized container and the physical properties of the polymer composition as disclosed herein are equivalent or similar to each other, it was confirmed that the polymer composition disclosed herein may produce a small to medium-sized container having excellent physical properties by recycling HDPE recovered from a secondary battery waste separator.

The present disclosure provides a polymer composition for manufacturing a small to medium-sized container which includes HDPE recovered from a secondary battery separator and has excellent mechanical properties. Specifically, a polymer composition having excellent processability may be prepared by recycling a waste separator for a secondary battery, and the polymer composition may be molded to manufacture a small to medium-sized container having excellent mechanical properties such as environmental stress crack resistance, flexural modulus, elongation, and impact strength and excellent environmental friendliness.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polymer composition for manufacturing a small to medium-sized container, wherein the polymer composition consists of i) high-density polyethylene (HDPE) and ii) optionally one or more additives, wherein the HDPE comprises:
   a) a first HDPE; and
   b) a second HDPE,
   wherein the polymer composition satisfies Equation 1:

$$-1 < \frac{x}{100} * \log(MI_a) + \frac{y}{100} * \log(MI_b) < 0 \quad \text{(Equation 1)}$$

wherein:
x is a weight percentage of the first HDPE in the polymer composition for manufacturing a small to medium-sized container,
y is a weight percentage of the second HDPE in the polymer composition for manufacturing a small to medium-sized container,
$MI_a$ is a melt flow index (MFI) of the first HDPE,
$MI_b$ is an MFI of the second HDPE, wherein MFI is measured in accordance with American Society for Testing and Materials standard ASTM D1238-10 (MFI measured at 190° C. at 2.16 kg), wherein the first HDPE comprises HDPE recovered from a separator for a secondary battery or the manufacture of a secondary battery, wherein the second HDPE has a density of about 0.930 g/cm³ to about 0.970 g/cm³, wherein the second HDPE has a polydispersity index (PDI) of at least about 6, and wherein the small to medium-sized container has a volume of less than 20 L.

2. The polymer composition for manufacturing a small to medium-sized container of claim 1, wherein the first HDPE comprises a) HDPE recovered from a separator for a secondary battery, wherein the recovery of the separator comprises removing any inorganic coating layers thereon, or b) HDPE recovered during manufacture of a separator for a secondary battery, wherein the HDPE recovered is scrap HDPE, a separator end recovered after trimming, or a combination of both.

3. The polymer composition for manufacturing a small to medium-sized container of claim 1, wherein the first HDPE has an MFI of about 0.01 g/10 min to 0.2 g/10 min.

4. The polymer composition for manufacturing a small to medium-sized container of claim 1, wherein the first HDPE has a flexural modulus of about 5,000 kg/cm² to about 15,000 kg/cm², a tensile strength at yield of about 200 kg/cm² to about 400 kg/cm² and an elongation at break of at least about 300%.

5. The polymer composition for manufacturing a small to medium-sized container of claim 1, wherein the second HDPE has an MFI of about 0.25 g/10 min to about 1.5 g/10 min.

6. The polymer composition for manufacturing a small to medium-sized container of claim 1, wherein the MFI of the first HDPE (MIa) and the MFI of the second HDPE (MIb) satisfy Equation 2:

$$0.15 \leq MI_b - MI_a \leq 5 \qquad \text{(Equation 2).}$$

7. The polymer composition for manufacturing a small to medium-sized container of claim 1, comprising about 20 wt. % to about 60 wt. % of the first HDPE and about 40 wt. % to about 80 wt. % of the second HDPE.

8. The polymer composition for manufacturing a small to medium-sized container of claim 1, wherein the polymer composition satisfies Equation 1.1:

$$-0.7 < \frac{x}{100} * \log(MI_a) + \frac{y}{100} * \log(MI_b) < -0.3. \qquad \text{(Equation 1.1)}$$

9. The polymer composition for manufacturing a small to medium-sized container of claim 1, wherein the polymer composition has an MFI of about 0.1 g/10 min to about 0.5 g/10 min.

10. The polymer composition for manufacturing a small to medium-sized container of claim 1, wherein the polymer composition has a tensile strength at yield of at least about 240 kg/cm² and an elongation at break of at least 300%.

11. The polymer composition for manufacturing a small to medium-sized container of claim 1, wherein the polymer composition has an environmental stress crack resistance (ESCR) of 30 hours or more, as measured in accordance with ASTM D1693.

12. The polymer composition for manufacturing a small to medium-sized container of claim 1, wherein the polymer composition has an Izod impact strength of 10 kgf cm/cm measured at a temperature of at least about 23±2° C. and a flexural modulus of at least about 7,500 kg/cm².

13. A small to medium-sized container comprising the polymer composition for manufacturing a small to medium-sized container of claim 1, wherein the small to medium-sized container has a volume of less than 20 L.

14. A method of manufacturing a small to medium-sized container, the method comprising
(a) obtaining high-density polyethylene (HDPE) recovered from a separator for a secondary battery, wherein the HDPE recovered from the separator for a secondary battery is a first HDPE;
(b) combining the first HDPE and a second HDPE to manufacture a pre-production polymer, and
(c) subjecting the pre-production polymer to conditions effective to generate the small to medium-sized container, wherein the first HDPE and second HDPE are selected to satisfy Equation 1:

$$-1 < \frac{x}{100} * \log(MI_a) + \frac{y}{100} * \log(MI_b) < 0 \qquad \text{(Equation 1)}$$

wherein:

x is a weight percentage of the first HDPE in the pre-production polymer;

y is a weight percentage of the second HDPE in the pre-production polymer;

$MI_a$ is a melt flow index (MFI) of the first HDPE;

$MI_b$ is an MFI of the second HDPE;

wherein MFI is measured in accordance with American Society for Testing and Materials standard ASTM D1238-10 (MFI measured at 190° C. at 2.16 kg), wherein the second HDPE has a density of about 0.930 g/cm³ to about 0.970 g/cm³, and wherein the small to medium-sized container has a volume of less than 20 L.

15. The method of manufacturing the small to medium-sized container of claim 14, wherein
a) the first HDPE comprises an inorganic coating layer and the method further comprises removing the inorganic coating layers thereon, or
b) the first HDPE is scrap HDPE, a separator end recovered after trimming, or a combination of both.

16. The method of manufacturing the small to medium-sized container of claim 14, wherein the conditions effective to generate the small to medium-sized container comprise one or more of injection-molding, blow-molding, and profile extrusion.

17. The method of claim 14, wherein combining the first HDPE and a second HDPE to manufacture a pre-production polymer comprises combining the first HDPE and second HDPE with one or more additives selected from the group consisting of an antioxidant, a UV absorber, a UV stabilizer, a lubricant, a pigment, a colorant, a filler, a plasticizer, a flow agent, an antistatic agent, a flame retardant, a slap agent, and an anti-block agent.

18. A polymer composition for manufacturing a small to medium-sized container, wherein the polymer composition consists of i) high-density polyethylene (HDPE) and ii)

optionally one or more additives, wherein the HDPE comprises:
a) a first HDPE; and
b) a second HDPE,
wherein the polymer composition satisfies Equation 1:

$$-1 < \frac{x}{100} * \log(MI_a) + \frac{y}{100} * \log(MI_b) < 0 \quad \text{(Equation 1)}$$

wherein:
x is a weight percentage of the first HDPE in the polymer composition for manufacturing a small to medium-sized container,
y is a weight percentage of the second HDPE in the polymer composition for manufacturing a small to medium-sized container;
$MI_a$ is a melt flow index (MFI) of the first HDPE;
$MI_b$ is an MFI of the second HDPE;
wherein MFI is measured in accordance with American Society for Testing and Materials standard ASTM D1238-10 (MFI measured at 190° C. at 2.16 kg),
wherein the first HDPE comprises HDPE recovered from a separator for a secondary battery or the manufacture of a secondary battery,
wherein the second HDPE has a density of about 0.930 g/cm$^3$ to about 0.970 g/cm$^3$ and an MFI of about 0.25 g/10 min to about 1.5 g/10 min, and
wherein the small to medium-sized container has a volume of less than 20 L.

* * * * *